United States Patent
Lee

(10) Patent No.: US 7,514,903 B2
(45) Date of Patent: Apr. 7, 2009

(54) BATTERY PACK

(75) Inventor: Hyung Bok Lee, Youngin-si (KR)

(73) Assignee: Samsung SDI Co., Ltd., Suwon (KR)

( * ) Notice: Subject to any disclaimer, the term of this patent is extended or adjusted under 35 U.S.C. 154(b) by 469 days.

(21) Appl. No.: 11/233,032

(22) Filed: Sep. 23, 2005

(65) Prior Publication Data
US 2006/0076926 A1    Apr. 13, 2006

(30) Foreign Application Priority Data
Sep. 24, 2004    (KR) ............... 10-2004-0077225

(51) Int. Cl.
  *H02J 7/04*    (2006.01)
  *H02J 7/16*    (2006.01)
  *H02J 7/00*    (2006.01)
  *H01M 2/00*    (2006.01)
(52) U.S. Cl. .............. 320/150; 320/112; 320/132; 429/61
(58) Field of Classification Search ............. 320/150, 320/132, 112; 429/61
See application file for complete search history.

(56) References Cited

U.S. PATENT DOCUMENTS 6,664,000 B1 *  12/2003  Sonobe ............... 429/61
2003/0027036 A1 *  2/2003  Emori et al. ........ 429/61

FOREIGN PATENT DOCUMENTS

| JP | 2001-185223 | 7/2001 |
| JP | 2001-307779 | 11/2001 |
| KR | 1997-0055054 | 7/1997 |

* cited by examiner

*Primary Examiner*—Akm E Ullah
*Assistant Examiner*—Yalkew Fantu
(74) *Attorney, Agent, or Firm*—H.C. Park & Associates, PLC

(57) ABSTRACT

A battery pack raises an alarm under overheated or high pressure conditions in the battery pack. The alarm is raised from the battery pack or an external device that is coupled with the battery pack when the temperature or the pressure of the battery pack exceeds a predetermined level. The battery pack includes a terminal that is coupled with a charging device or an external device, a battery cell coupled with the terminal so that the battery cell can be charged or discharged, a sensor that is installed in the battery cell to detect at least one of a temperature and a pressure of the battery cell, and an alarm unit that compares a value detected by the sensor with a reference level and raises an alarm for a user when the value detected by the sensor exceeds the reference level.

12 Claims, 6 Drawing Sheets

BATTERY PACK

CROSS REFERENCE TO RELATED APPLICATION

This application claims priority to and the benefit of Korean Patent Application No. 10-2004-0077225, filed on Sep. 24, 2004, which is hereby incorporated by reference for all purposes as if fully set forth herein.

BACKGROUND OF THE INVENTION

1. Field of the Invention

The present invention relates to a battery pack in which an alarm is raised from the battery pack or an external device that is coupled with the battery pack when the battery pack overheats and/or a build-up of pressure occurs in the battery pack.

2. Description of the Background

Recently, various studies related to rechargeable batteries have been carried out based on the technological advancement of portable electronic devices such as mobile phones, notebook computers, camcorders, and personal digital assistants (PDAs). In particular, the rechargeable batteries include Ni—Cd batteries, Pb batteries, Ni—MH batteries, Ni—Zn batteries, lithium ion batteries, lithium polymer batteries, lithium metal batteries, and zinc-air batteries. Such rechargeable batteries are combined with charging/discharging circuits, thereby forming battery packs in which charging/discharging operations are performed through terminals of the battery packs.

FIG. 1 is a block view of a conventional battery pack.

As shown in FIG. 1, the conventional battery pack includes terminals (P+ and P−), a charging/discharging field effect transistor (FET) device 12, a temperature fuse 13, a fuse 14, a battery cell 15, a primary protective circuit 16, a secondary protective circuit 17, a smart functional unit 18, and a sensor resistor 19.

In the conventional battery pack with the above structure, an external charging device or an external device is coupled with the battery pack through the terminals (P+ and P−) for charging/discharging operations. A path formed between the terminals (P+ and P−) and the battery cell 15 is referred to as a charging/discharging path through which relatively high current may flow.

For example, if the external charging device is coupled with the terminals (P+ and P−), the battery cell 15 may be charged. At this time, a charging path is formed through the terminal (P+), the charging/discharging FET device 12, the temperature fuse 13, the fuse 14, the battery cell 15 and the terminal (P−). In addition, if the external device is coupled with the terminals (P+ and P−), the battery cell 15 may be discharged. At this time, a discharge path is formed through the battery cell 15, the fuse 14, the temperature fuse 13, the charging/discharging is FET device 12, the terminal (P+), the external device, and the terminal (P−).

The battery cell 15 stores information related to a cell, such as a charge electric potential of the cell, and an amount of current flowing through the cell, and outputs the cell information to the primary and secondary protective circuits 16 and 17 and the smart functional unit 18. The primary protective circuit 16 controls the on/off operation of the charging/discharging FET device 12 depending on the cell information that is transmitted thereto from the battery cell 15. The secondary protective circuit 17 controls the operation of the fuse 14 depending on the cell information that is transmitted thereto from the battery cell 15 when the primary protective circuit 16 or the charging/discharging FET device 12 mal-function. For instance, if an excessive amount of current is applied to the battery cell 15, the secondary protective circuit 17 detects it and turns off both ends of the fuse 14, thereby shielding the excess current. The smart functional unit 18 displays the charged state of the battery cell and raises an alarm when over-charge or over-discharge occurs. The temperature fuse 13 detects the temperature of the charging/discharging FET device 12 and shuts off both ends thereof when the temperature of the charging/discharging FET device 12 exceeds a rating temperature, thereby preventing the charging/discharging FET device 12 from exploding or being burned.

Although the conventional battery pack can prevent the over-charge and over-discharge of the battery cell or the short circuit of the external device, the conventional battery pack does not raise an alarm if the temperature or pressure of the battery cell rises above the standard operating conditions due to heat that is generated in the battery cell or applied to the battery cell from external sources. For example, when the external device consumes a great amount of power or when a user enters a high-temperature room such as a sauna or a bathroom with the external device coupled with the battery pack, the temperature/pressure of the battery pack may rise suddenly. However, the conventional battery pack does not raise an alarm for the user.

If the temperature of the battery pack rises, a catalyst or an active material contained in the battery pack may dissolve and emit gases. Thus, internal pressure of the battery pack may rise suddenly, causing swelling in the battery cell and deformation of the exterior of the battery pack. In this case, the battery pack cannot be mounted on the external device. In an extreme case, the battery pack may explode or ignite while generating smoke.

SUMMARY OF THE INVENTION

The present invention provides a battery pack in which an alarm is raised from the battery pack or an external device that is coupled with the battery pack when the temperature and/or the pressure of the battery pack exceeds a reference temperature and/or pressure due to heat that is generated inside the battery pack or applied to the battery pack from external sources.

Additional features of the invention will be set forth in the description which follows, and in part will be apparent from the description, or may be learned by practice of the invention.

The present invention discloses a battery pack comprising a terminal coupled with a charging device or an external device, a battery cell coupled with the terminal such that the battery cell can be charged or discharged, a sensor installed in the battery cell to detect at least one of a temperature and a pressure of the battery cell, and an alarm unit that compares a value detected by the sensor with a reference level and raises an alarm for a user when the value detected by the sensor exceeds the reference level.

The present invention also discloses a battery pack comprising a terminal coupled with a charging device or an external device, a battery cell coupled with the terminal in a row in such a manner that the battery cell can be charged or discharged, a sensor installed in the battery cell to detect at least one of a temperature and a pressure of the battery cell, and a sensor terminal that outputs an electrical signal from the sensor to the external device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
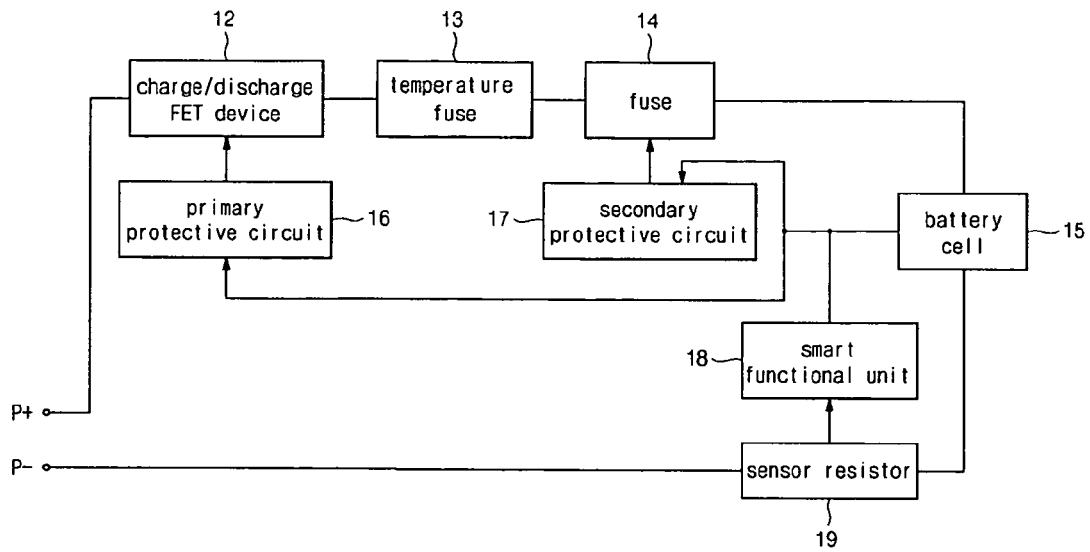
FIG. 1 is a block view of a conventional battery pack.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

The battery pack of the present invention may include an alarm device, a temperature sensor, and/or a pressure sensor. Accordingly, when the temperature/pressure of the battery cell exceeds the reference temperature/pressure due to heat that is generated in the battery cell or heat applied to the battery cell from an external environment, the alarm device may raise an alarm visually and/or audibly alert the user of the present temperature/pressure conditions of the battery pack.

In addition, according to the present invention, the temperature sensor and/or the pressure sensor is installed in the battery cell and the display unit or the sound generating unit is installed in the external device to promptly alert the user of the present temperature/pressure conditions of the battery pack.

Figure 2A:
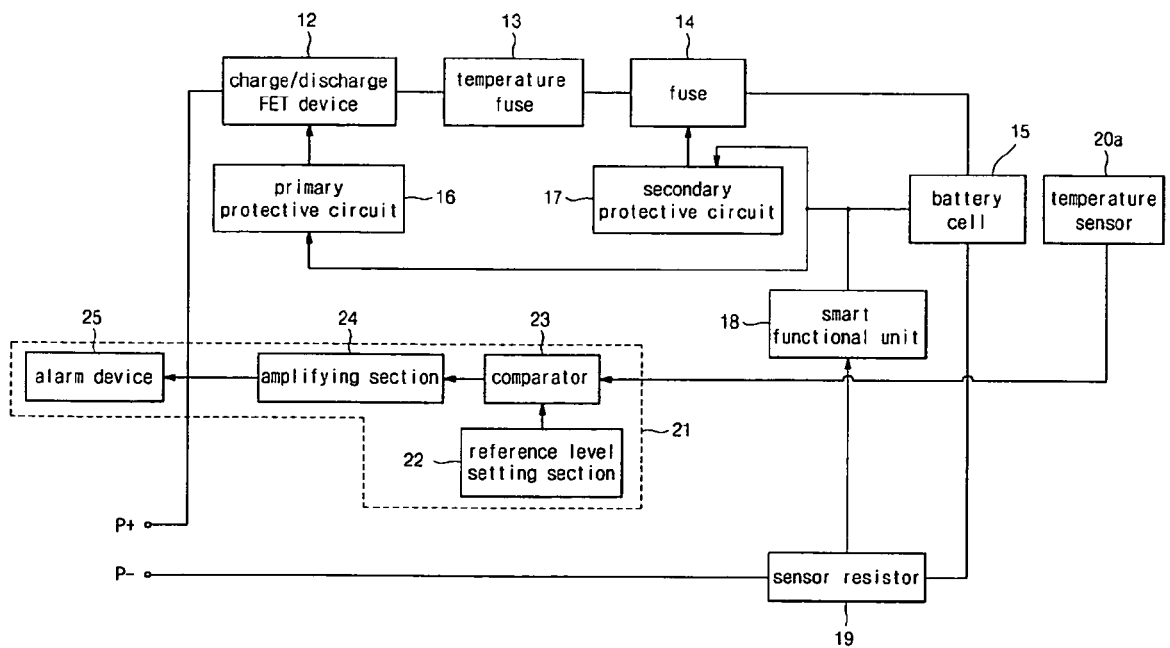
FIG. 2A is a block view of a battery pack according to an exemplary embodiment of the present invention.

FIG. 2A is a block view of a battery pack according to an exemplary embodiment of the present invention.

As shown in FIG. 2A, the battery pack of the present invention includes terminals (P+ and P−), a charging/discharging FET device 12, a temperature fuse 13, a fuse 14, a battery cell 15, a primary protective circuit 16, a secondary protective circuit 17, a smart functional unit 18, a sensor resistor 19, a temperature sensor 20a, and an alarm unit 21.

A charging device or an external device (not shown) is coupled with the terminals (P+ and P−). Herein, the external device refers to portable electronic devices such as notebook computers, camcorders, and PDAs, for example.

If the charging device is coupled with the terminals (P+ and P−), voltage is applied to the terminal (P+) through the charging/discharging FET device 12, the temperature fuse 13, the fuse 14, the battery cell 15, the sensor resistor 19 and the terminal (P−). Alternately, if the external device is coupled with the terminals (P+ and P−), discharge current may flow through the battery cell 15, the fuse 14, the temperature fuse 13, the charging/discharging FET device 12, the terminal (P+), the external device, the terminal (P−), and the sensor resistor 19.

The charging/discharging FET device 12 includes a charging FET device and a discharging FET device. The charging FET device achieves an over-charge voltage state during charging and is turned off when over-charge current is applied thereto, thereby protecting the battery cell 15. In addition, the discharging FET device is turned off when over-charge voltage or over-charge current states occur during a discharging or when the external device undergoes a short circuit, thereby protecting the battery cell 15.

The temperature fuse 13 is physically mounted on the charging/discharging FET device 12 to detect the temperature of the charging/discharging FET device 12. That is, when the temperature of the charging/discharging FET device 12 rises abnormally, the temperature fuse 13 shuts off the charging/discharging FET device 12. For instance, the charging/discharging FET device 12 may not switch off under an over-charged state or an over-discharged state due to a temperature increase in the charging/discharging FET device 12. In this case, the temperature fuse 13 is tripped due to heat generated from the charging/discharging FET device 12, thereby blocking the current path. Since the temperature fuse 13 operates irreversibly, a used temperature fuse 13 must be replaced after each use.

The fuse 14 may be positioned in between the temperature fuse 13 and the battery cell 15. The operation of the fuse 14 does not directly relate to the temperature of the charging/discharging FET device 12 and the battery cell 15. That is, when the charging/discharging FET device 12 and the temperature fuse 13 fail to operate, the fuse 14 allows current to be applied to a heating wire (not shown) installed at one side of the fuse 14, thereby tripping the fuse 14. In a normal state, the current is not applied to the heating wire that is used to trip the fuse 14.

The battery cell 15 is an energy source that may be charged/discharged at a predetermined voltage. Thus, the battery cell is a rechargeable battery. For instance, the battery cell 15 may include a lithium ion battery, a lithium polymer battery, or equivalents thereof. The present invention does not limit the type of the battery cells that may be used.

During charging/discharging of the battery cell 15, the sensor resistor 19 detects the charging/discharging current that flows through the battery cell 15 and outputs the charging/discharging current to the smart functional unit 18.

As mentioned above, the primary protective circuit 16 sends a signal to the charging/discharging FET device 12 when the battery cell over-charges or over-discharges or when the external device short circuits, thereby blocking the current path. That is, in an over-charged state, the primary protective circuit 16 transmits a low signal or a high signal to the charging FET device, thereby switching off the charging FET device. In addition, when the battery cell is over-discharged state or when a short circuit occurs in the external device, the primary protective circuit 16 transmits a low signal or a high signal to the discharged FET device, thereby switching off the discharging FET device. In a normal charging/discharging state, the primary protective circuit 16 switches on the charging FET device and the discharging FET device.

When the charging/discharging FET device 12 and the temperature fuse 13 fail to operate, the rechargeable protective circuit 17 applies a strong signal to the heating wire (not shown) installed in the fuse 14, thereby forcibly tripping the fuse 14.

The smart functional unit 18 detects information about the battery cell 15, such as charging voltage and discharging voltage, and sends the voltage information to the primary protective circuit 16 and secondary protective circuit 17. In addition, the smart functional unit 18 receives information about charging current and discharging current from the sensor resistor 19 and sends the current information to the primary protective circuit 16 and secondary protective circuit 17.

The temperature sensor 20a is installed at one side of the battery cell 15 to directly detect the temperature of the battery cell 15. In detail, the temperature sensor 20a may be positioned on a surface of the battery cell 15 or on a surface of the battery pack that is coated with plastic resin. The temperature sensor 20a detects the temperature of the battery cell 15, which may rise due to heat that is generated from the battery cell 15 or heat that is applied to the battery cell 15 from the external environment, such as a sauna or a bathroom. Upon detecting the temperature of the battery cell 15, the temperature sensor 20a converts the temperature into an electrical signal and outputs the electrical signal to an alarm unit 21. The temperature sensor 20a may include a thermocouple, a thermister, a varistor, a semiconductor, or equivalents thereof, but is not limited thereto.

The alarm unit 21 compares the temperature detected by the temperature sensor 20a with a reference level and raises an alarm if the detected temperature exceeds the reference level. The alarm unit 21 includes a reference level setting section 22, a comparator 23, an amplifying section 24, and an alarm device 25.

The reference level setting section 22 sets the reference temperature of the battery cell 15 which is the rating temperature of the battery cell 15 that allows the battery cell 15 to operate normally.

The comparator 23 compares the temperature detected by the temperature sensor 20a with the reference level set by the reference level setting section 22 and outputs an electrical signal if the detected temperature exceeds the reference level. If a low signal is input to the comparator 23, the comparator 23 outputs a high signal. In addition, if a high signal is input to the comparator 23, the comparator 23 outputs a low signal. That is, a signal that is input to the comparator 23 is inversed on output.

The amplifying section 24 amplifies the electrical signal that is output from the comparator 23 and outputs an amplified current and an amplified voltage.

The alarm device 25 raises an alarm based on the electrical signal that is output from the amplifying section 24 to visually or audibly notify the user that the present temperature of the battery pack exceeds the reference temperature. For example, the alarm device 25 may be a sound alarm device that outputs a sound for the user or it may be an optical alarm device that generates an optical signal for the user. The alarm device 25 is directly installed at one side of the battery pack.

Figure 2B:
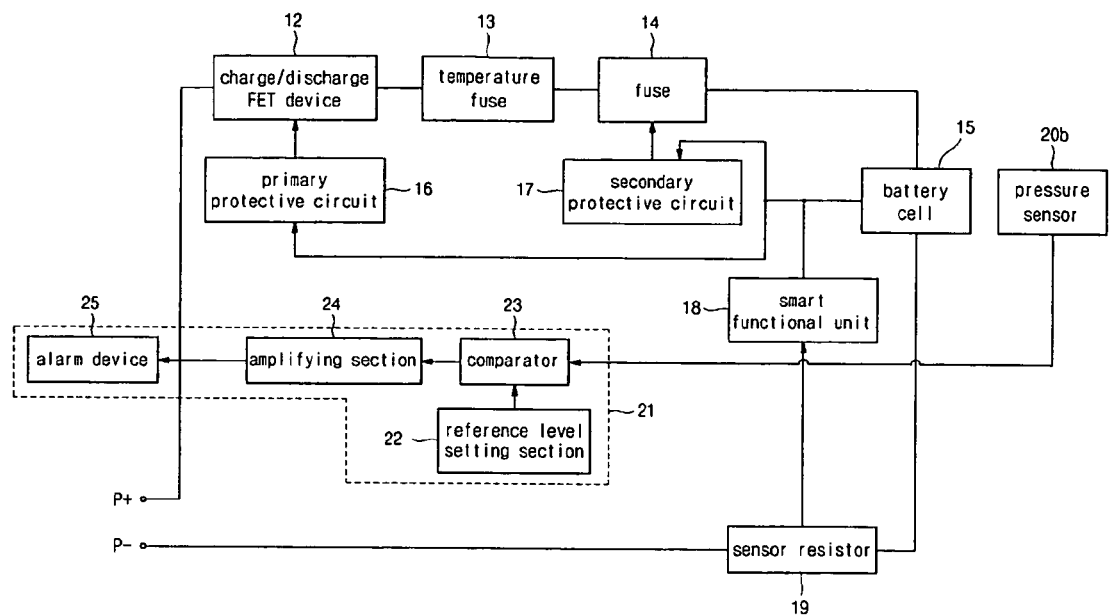
FIG. 2B is a block view of a battery pack according to another exemplary embodiment of the present invention.

FIG. 2B is a block view of a structure of a battery pack according to another exemplary embodiment of the present invention.

As shown in FIG. 2B, the battery pack includes terminals (P+ and P−), a charging/discharging FET device 12, a temperature fuse 13, a fuse 14, a battery cell 15, a primary protective circuit 16, a rechargeable protective circuit 17, a smart functional unit 18, a sensor resistor 19, a pressure sensor 20b, and an alarm unit 21. The structure and the operation of the battery pack shown in FIG. 2B are similar to those of the battery pack shown in FIG. 2A. That is, the structure and the operation of the terminals (P+ and P−), the charging/discharging FET device 12, the temperature fuse 13, the fuse 14, the battery cell 15, the primary protective circuit 16, the rechargeable protective circuit 17, the smart functional unit 18, the sensor resistor 19 of the battery pack shown in FIG. 2B are similar to those of the battery pack shown in FIG. 2A, so they will not be further described below. Accordingly, the following description focus on differences between the battery pack shown in FIG. 2A and the battery pack shown in FIG. 2B.

The pressure sensor 20b is installed in the battery cell 15 to directly/indirectly detect pressure of the battery cell 15. In particular, the pressure sensor 20b may be a semiconductor pressure sensor that is directly coupled with the battery cell to detect the internal pressure of the battery cell 15. In addition, the pressure sensor 20b may be a strain gauge, that is installed on a surface of the battery cell 15 or on a surface of the battery pack that is coated with plastic resin to indirectly detect the internal pressure of the battery cell 15. If the internal pressure of the battery cell 15 increases, the surface of the battery pack may swell. The swelling of the battery cell 15 may be measured by the strain gauge, thereby indirectly recognizing the internal pressure of the battery cell 15. In addition to the above, various pressure sensors may be fabricated using various materials. The present invention does not limit the type or materials of the pressure sensors.

The alarm unit 21 compares the pressure detected by the pressure sensor 20b with a reference level and raises an alarm if the detected pressure exceeds the reference level. In particular, the alarm unit 21 includes a reference level setting section 22, a comparator 23, an amplifying section 24, and an alarm device 25.

The reference level setting section 22 sets the reference pressure of the battery cell 15, which is the rating pressure of the battery cell 15 that allows the battery cell 15 to operate normally. The comparator 23 compares the pressure detected by the pressure sensor 20b with the reference level set by the reference level setting section 22 and outputs an electrical signal if the detected pressure exceeds the reference level. If the comparator 23 inputs a low signal, the comparator 23 outputs a high signal. In addition, the comparator 23 inputs a high signal, the comparator 23 outputs a low signal. That is, the signal input by the comparator 23 is inversed. The amplifying section 24 amplifies the electrical signal that is output from the comparator 23 and outputs an amplified current and an amplified voltage.

The alarm device 25 raises an alarm based on the electrical signal that is output from the amplifying section 24 to visually or audibly notify the user that the present pressure of the battery pack exceeds the reference pressure. For example, the alarm device 25 may be a sound alarm device that outputs a sound for the user or it may be an optical alarm device that generates an optical signal for the user. The alarm device 25 is directly installed at one side of the battery pack.

Figure 2C:
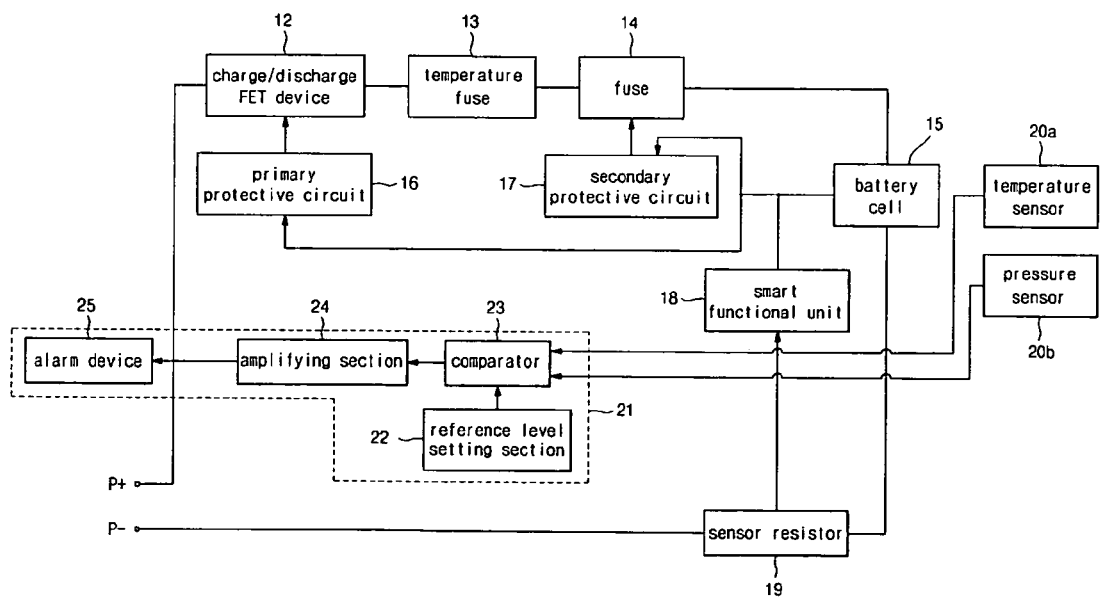
FIG. 2C is a block view of a battery pack according to another exemplary embodiment of the present invention.

FIG. 2C is a block view of a structure of a battery pack according to still another exemplary embodiment of the present invention.

As shown in FIG. 2C, the battery pack includes the temperature sensor 20a and the pressure sensor 20b, which are simultaneously installed on the battery cell 15. That is, as opposed to the above-mentioned embodiments that only detect one of the temperature and the pressure of the battery cell, the temperature and the pressure of the battery cell 15 may be simultaneously detected in the battery pack of the present embodiment.

The electrical signals of the temperature sensor 20a and the pressure sensor 20b are input into the alarm unit 21. Accordingly, the alarm unit 21 raises an alarm if the detected temperature exceeds the reference temperature or if the detected pressure exceeds the reference pressure. That is, the alarm unit 21 includes a reference level setting section 22, a comparator 23, an amplifying section 24, and an alarm device 25 that all function in the same manner as previously described for FIG. 2A and FIG. 2B.

Figure 3A:
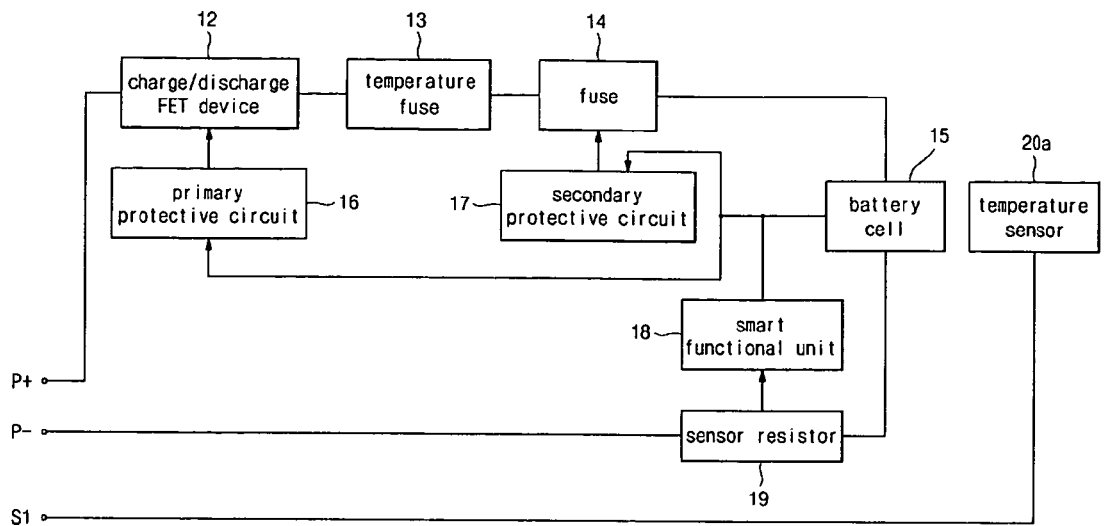
FIG. 3A is a block view of a battery pack according to another exemplary embodiment of the present invention.
Figure 3B:
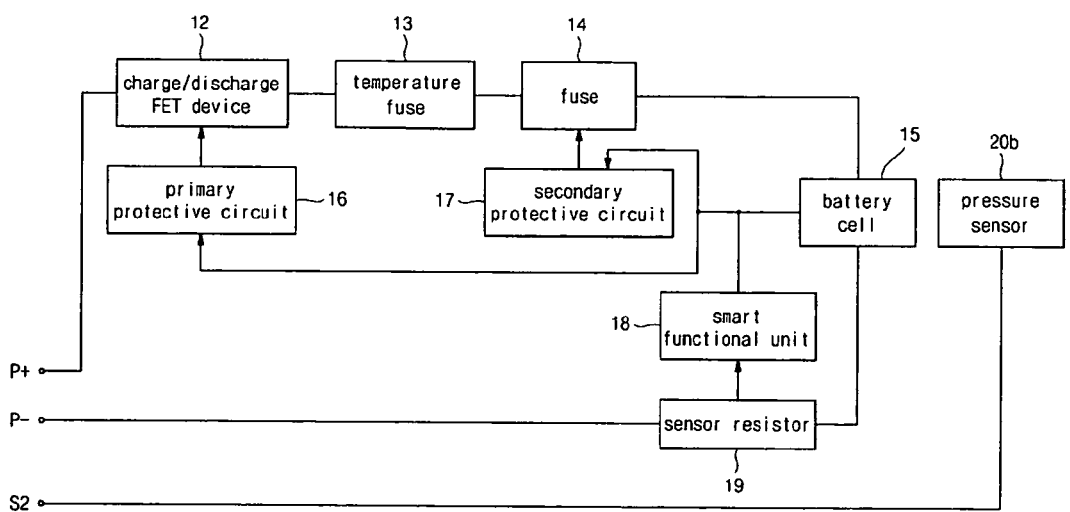
FIG. 3B is a block view of a battery pack according to another exemplary embodiment of the present invention.
Figure 3C:
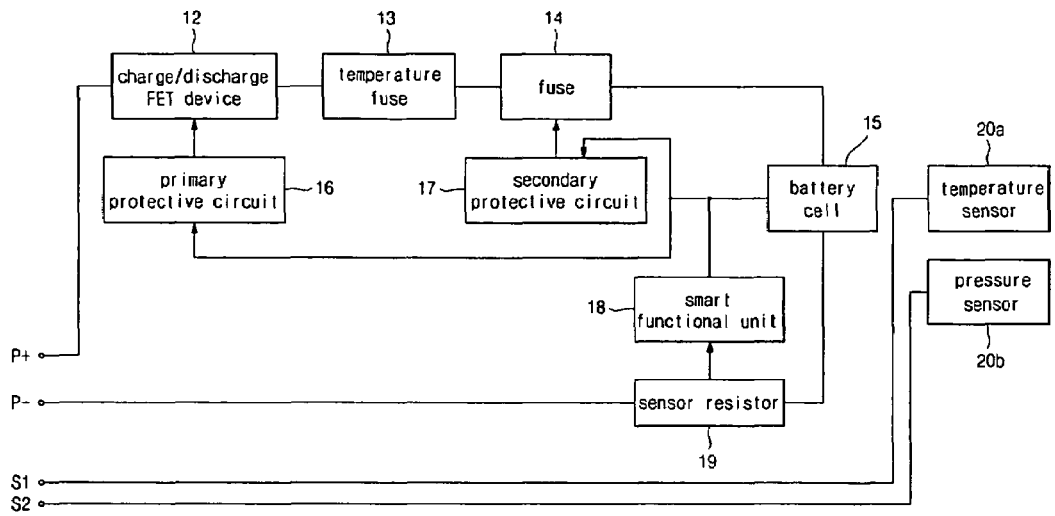
FIG. 3C is a block view of a battery pack according to another exemplary embodiment of the present invention.
Figure 3D:
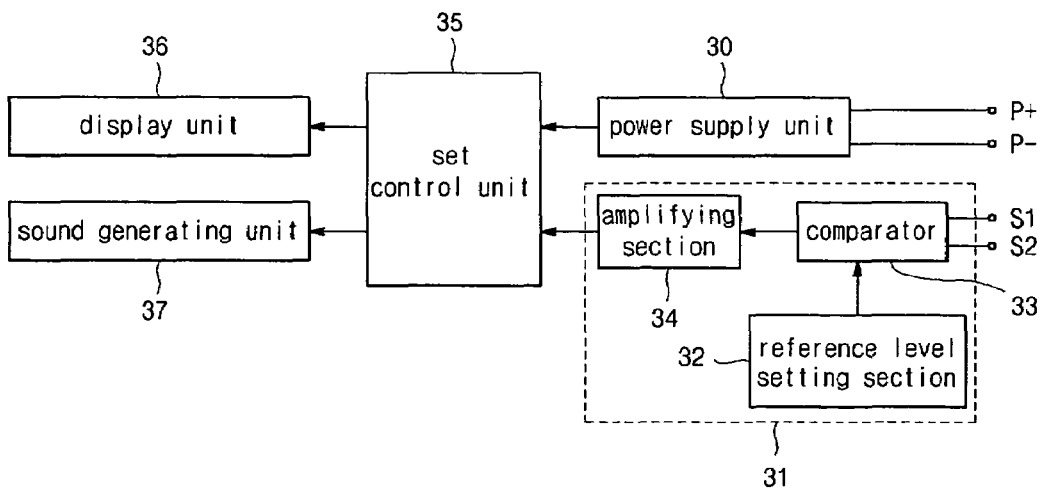
FIG. 3D is a block view of an external device coupled with a battery pack shown in FIG. 3A, FIG. 3B, and FIG. 3C.

FIG. 3A is a block view of a battery pack according to another exemplary embodiment of the present invention. FIG. 3B is a block view of a battery pack according to another exemplary embodiment of the present invention. FIG. 3C is a block view of a battery pack according to another exemplary embodiment of the present invention. FIG. 3D is a block view of an external device that is coupled with the battery pack shown in FIG. 3A, FIG. 3B, and FIG. 3C. The following description will focus on differences between the battery pack shown in FIG. 2A, FIG. 2B, and FIG. 2C and the battery pack shown in FIG. 3A, FIG. 3B, and FIG. 3C.

According to the embodiment of FIG. 3A, only the temperature sensor 20a is installed on the battery cell 15 and elements of an alarm unit 31 are provided in the external device. The temperature sensor 20a installed on the battery cell 15 of the battery pack is coupled with a sensor terminal S1.

In addition, according to the-embodiment shown in FIG. 3B, only the pressure sensor 20b is installed on the battery cell 15 and elements of an alarm unit 31 are provided in the external device. The pressure sensor 20b positioned on the battery cell 15 of the battery pack is coupled with a sensor terminal S2.

In addition, in the embodiment shown in FIG. 3C, only the temperature sensor 20a and the pressure sensor 20b are installed on the battery cell 15 and elements of an alarm unit 31 are provided in the external device. The temperature sensor 20a and the pressure sensor 20b installed on the battery cell 15 of the battery pack are coupled with sensor terminals S1 and S2, respectively.

As shown in FIG. 3D, the external device includes a power supply unit 30, an alarm unit 31, a set control unit 35, a display unit 36, and a sound generating unit 37.

The power supply unit 30 is coupled with the terminals (P+ and P−) to regulate power to stably supply it to the battery pack. The alarm unit 31 is coupled with the sensor terminal S1 to compare the temperature detected by the temperature sensor 20a with the is reference level and to raise an alarm if the detected temperature exceeds the reference level.

In addition, the alarm unit 31 may be coupled with the sensor terminal S2 to compare the pressure detected by the pressure sensor 20b with the reference level and to raise an alarm if the detected pressure exceeds the reference level.

In addition, the alarm unit 31 may be coupled with both sensor terminals S1 and S2 to compare the temperature and the pressure detected by the temperature sensor 20a and the pressure sensor 20b with the reference levels and to raise an alarm if the detected temperature or pressure exceed the reference levels.

Herein, if only the temperature sensor 20a is installed in the battery pack, the alarm unit 31 is coupled with the sensor terminal S1. If only the pressure sensor 20b is installed in the battery pack, the alarm unit 31 is coupled with the sensor terminal S2. In addition, if the temperature sensor 20a and the pressure sensor 20b are installed in the battery pack, the alarm unit 31 is coupled with both sensor terminals S1 and S2.

The alarm unit 31 may include a reference level setting section 32 for setting the reference temperature, the reference pressure, or both the reference temperature and pressure of the battery cell 15. The alarm unit 31 may also include a comparator 33 to compare the temperature that is detected by the temperature sensor 20a and/or the pressure that is detected by the pressure sensor 20b with the reference level set by the reference level setting section 32 and to output an electrical signal if the detected temperature or pressure exceed the reference levels. In addition, an amplifying section 34 amplifies the signal that is output from the comparator 33 to output the amplified signal to the set control unit 35.

The set control unit 35 receives regulated power from the power supply unit 30 and outputs a control signal depending on an output signal of the alarm unit 31.

In addition, the display unit 36 visually notifies the user that the present temperature/pressure of the battery pack exceeds the reference temperature/pressure depending on the output signal of the set control unit 35. Predetermined characters, still pictures, or moving pictures are displayed in the display unit 36 to notify the user of the present temperature/pressure condition in the battery pack.

The sound generating unit 37 audibly notifies the user that the present temperature/pressure of the battery pack exceeds the reference temperature/pressure depending on the output signal of the set control unit 35. Predetermined voice messages, ring tones, or music may be generated from the sound generating unit 37 to notify the user of the present temperature/pressure conditions in the battery pack.

Figure 4A:
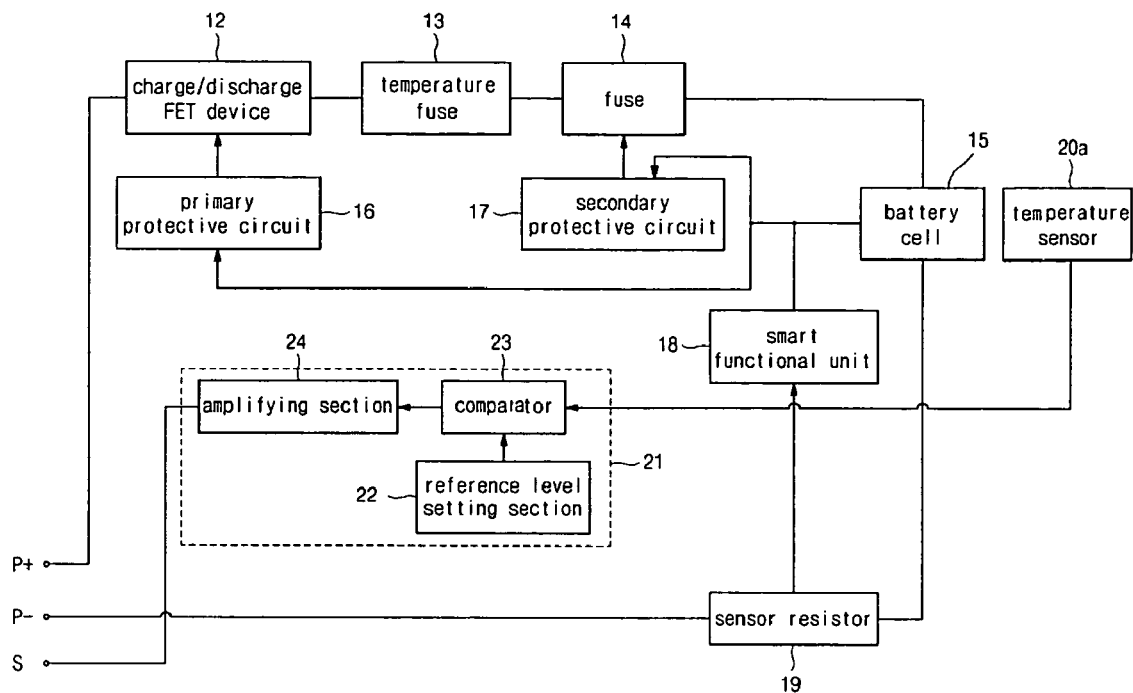
FIG. 4A is a block view of a battery pack according to another exemplary embodiment of the present invention.
Figure 4B:
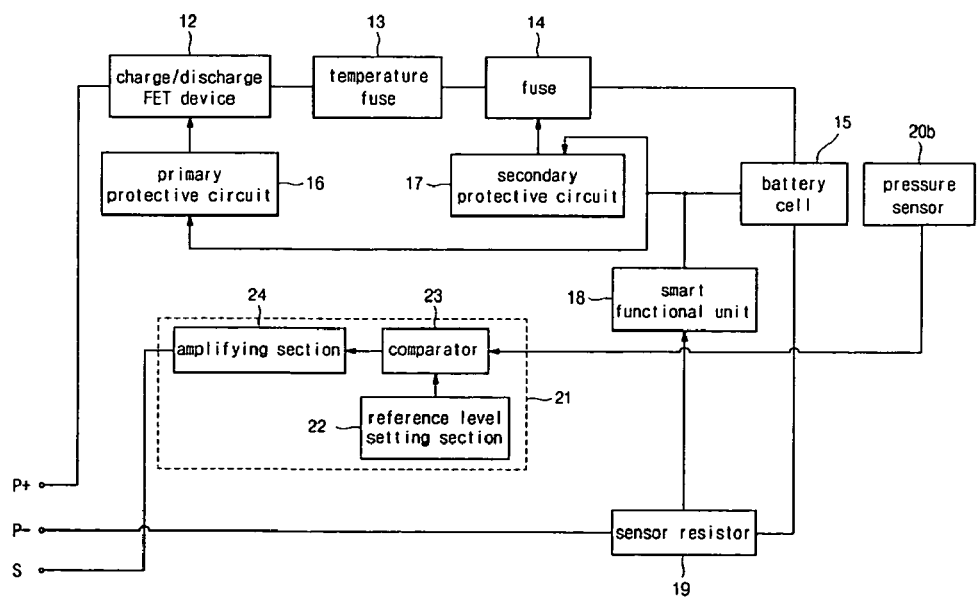
FIG. 4B is a block view of a battery pack according to another exemplary embodiment of the present invention.
Figure 4C:
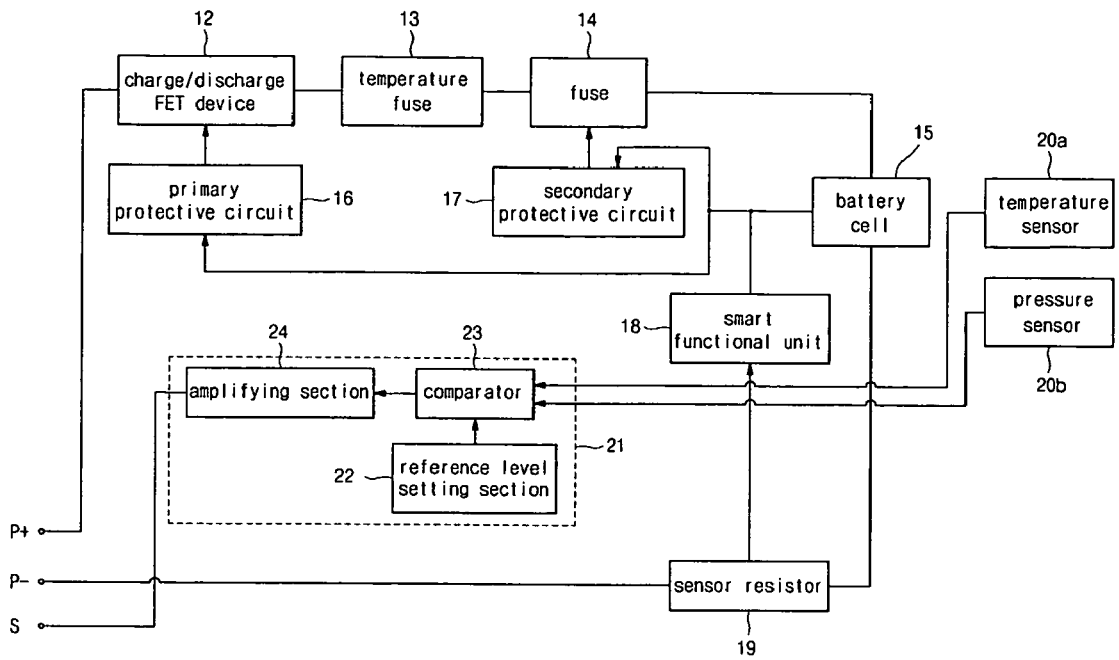
FIG. 4C is a block view of a battery pack according to another exemplary embodiment of the present invention.
Figure 4D:
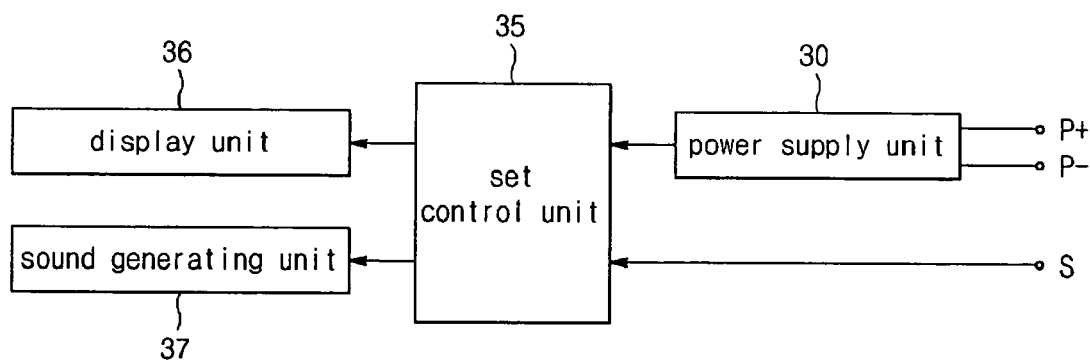
FIG. 4D is a block view of an external device coupled with a battery pack shown in FIG. 4A, FIG. 4B, FIG. 4C, and FIG. 4D.

FIG. 4A is a block view of a battery pack according to another exemplary embodiment of the present invention. FIG. 4B is a block view of a battery pack according to another exemplary embodiment of the present invention. FIG. 4C is a block view of a battery pack according to another exemplary embodiment of the present invention. FIG. 4D is a block view of an external device connected to the battery pack shown in FIG. 4A, FIG. 4B, and FIG. 4C. The following description will focus on differences between the battery pack shown in FIG. 3A, FIG. 3B, and FIG. 3C and the battery pack shown in FIG. 4A, FIG. 4B, and FIG. 4C.

According to the embodiment of FIG. 4A, the battery pack includes a temperature sensor 20a and an alarm unit 21 including a reference level setting section 22, a comparator 23, and an amplifying section 24. The alarm member notifies the user of the over-heating of the battery pack and may be installed in the external device instead of in the battery pack.

According to the embodiment shown in FIG. 4B, the battery pack includes a pressure sensor 20b and an alarm unit 21 including a reference level setting section 22, a comparator 23, and an amplifying section 24.

In addition, according to the embodiment shown in FIG. 4C, the battery pack includes a temperature sensor 20a, a pressure sensor 20b, and an alarm unit 21 including a reference level setting section 22, a comparator 23, and an amplifying section 24.

According to the battery pack shown in FIG. 4A, FIG. 4B, and FIG. 4C, the temperature sensor 20a and the pressure sensor 20b detect the temperature, pressure, and temperature and pressure, respectively of the battery cell 15 and compare the detected temperature and pressure with reference levels. If the detected temperature and/or pressure of the battery cell 15 exceed the reference level, an amplified signal is directly input into the set control unit 35 of the external device, as shown in FIG. 4D by using the sensor terminal S. Thus, the set control unit 35 visually and/or audibly notifies the user of the present temperature and/or pressure conditions of the battery pack through the display unit 36 or the sound generating unit 37.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

WHAT IS CLAIMED IS:

1. A battery pack, comprising:
   a terminal to couple with a charging device or an external device;
   a battery cell coupled with the terminal;
   a temperature sensor positioned in the battery cell to detect a temperature of the battery cell;
   pressure sensor positioned in the battery cell to detect a pressure of the battery cell:
   a temperature fuse coupled with the battery cell; and
   an alarm unit that compares a value detected by the temperature sensor with a reference temperature level and a value detected by a pressure sensor with a reference pressure level and raises an alarm for a user when the value detected by the temperature sensor exceeds the reference pressure level or the value detected by the pressure senor exceeds the reference pressure level.

2. The battery pack of claim 1,
   wherein the temperature sensor detects the temperature of the battery cell and converts the temperature of the battery cell into a predetermined electrical signal to output the predetermined electrical signal to the alarm unit, and the pressure sensor detects the pressure of the battery cell and converts the pressure of the battery cell into a predetermined electrical signal to output the predetermined electrical signal to the alarm unit.

3. The battery pack of claim 1,
   wherein the alarm unit includes a reference level setting section to set the reference temperature level to a temperature value of the battery cell and the reference pressure level to a pressure value of the battery cell, a comparator to compare the value detected by the temperature sensor to the reference temperature level and the value detected by the pressure sensor with the reference pressure level set by the reference level setting section and to output a predetermined electrical signal if the value detected by the temperature sensor exceeds the reference temperature level or value detected by the pressure sensor exceed exceeds the reference pressure level, and an alarm device to raise the alarm based on an output signal of the comparator.

4. The battery pack of claim 3,
   wherein the reference level setting section sets the rating temperature as the reference temperature level and the rating pressure of the battery cell as the reference pressure level.

5. The battery pack of claim 1,
   wherein the alarm unit includes a sound alarm device that generates a sound or an optical alarm device that generates a visual signal, such as light.

6. The battery pack of claim 1, further comprising:
   a primary protective circuit that receives information related to charging/discharging voltage from the battery cell and controls an on/off operation of a charging/discharging field effect transistor (FET) device that is installed in a charging path that is formed between the terminal and the battery cell according to a charging/discharging mode.

7. The battery pack of claim 1, further comprising:
   a rechargeable protective circuit that receives information related to charging/discharging voltage from the battery cell and controls a fuse that is positioned in a charging path that is formed between the terminal and the battery cell.

8. The battery pack of claim 6, further comprising:
   a sensor resistor that is positioned in between the terminal and the battery cell to detect charging/discharging current of the battery cell and to output the charging/discharging current of the battery cell to the primary protective circuit.

9. The battery pack of claim 8, further comprising:
   a sensor resistor that is aligned between the terminal and the battery cell to detect charging/discharging current of the battery cell and to output the charging/discharging current of the battery cell to the rechargeable protective circuit.

10. The battery pack of claim 6,
    wherein the charging/discharging FET device includes a charging FET device and a discharging FET device in which the charging FET device is turned off during over-charge conditions and the discharging FET device is turned off during over-discharge conditions.

11. The battery pack of claim 6,
    wherein the temperature fuse is positioned in between the charging/discharging FET device and the battery cell and is turned off when a temperature of the charging/discharging FET device exceeds the reference level.

12. The battery pack of claim 1,
    wherein the external device is a cellular phone or a notebook computer.

* * * * *